Figure 1:
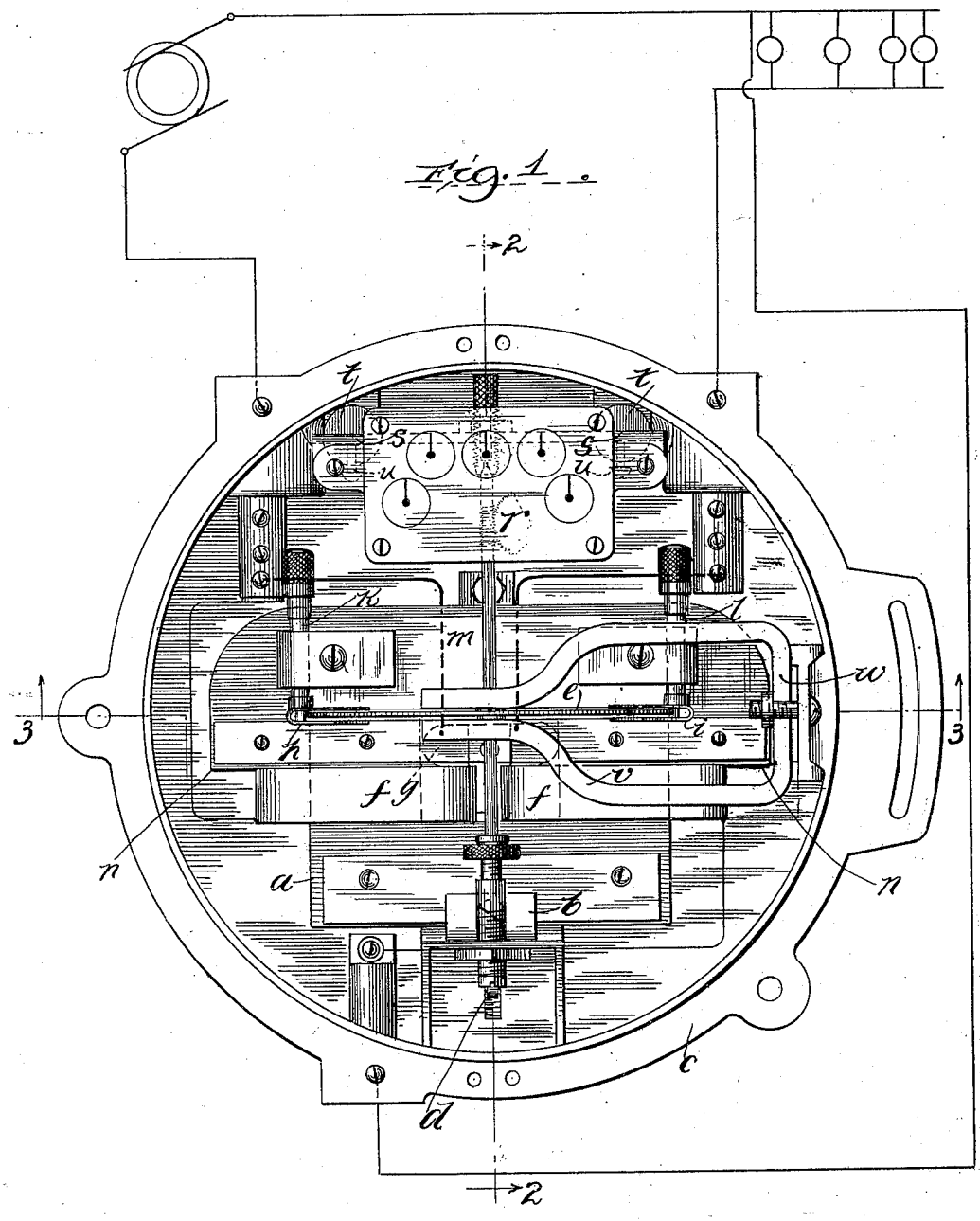

No. 643,162. Patented Feb. 13, 1900.
G. A. SCHEEFFER.
ALTERNATING CURRENT METER.
(Application filed May 11, 1899.)

(No Model.) 3 Sheets—Sheet 1.

Witnesses:
R. White.
Harry B. White.

Inventor:
Gustave A. Scheeffer.
By Charles A. Brown & Cragg
Attorneys.

No. 643,162. Patented Feb. 13, 1900.
G. A. SCHEEFFER.
ALTERNATING CURRENT METER.
(Application filed May 11, 1899.)
(No Model.) 3 Sheets—Sheet 2.
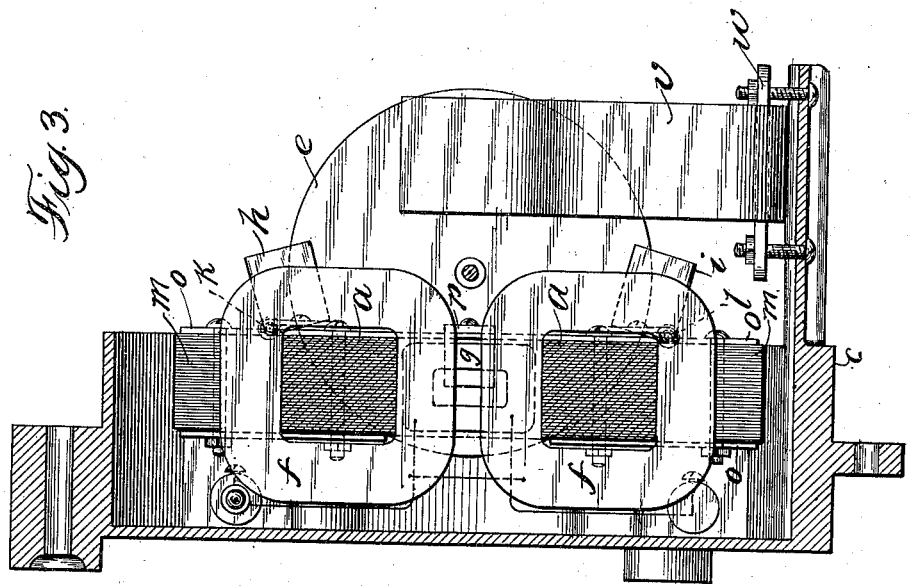
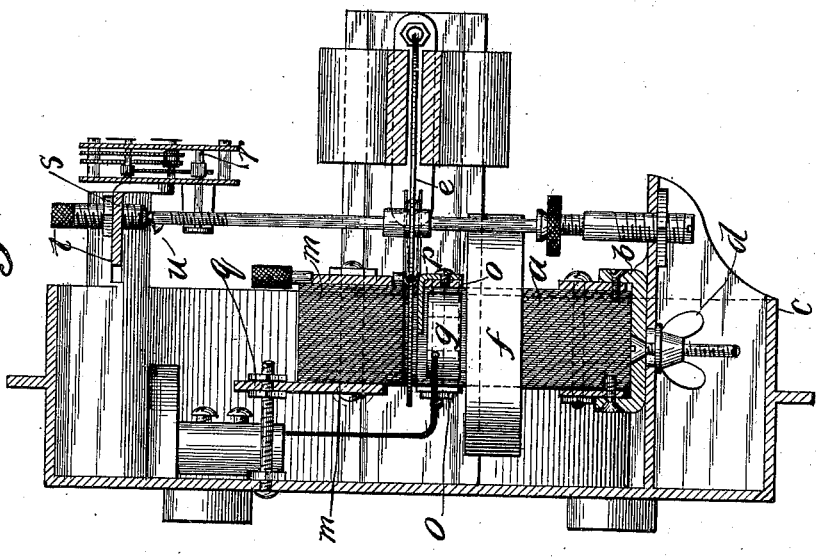
Witnesses:
R. White
Harry P. White
Inventor:
Gustave A. Scheeffer.
By Charles A. Brown & Cragg
Attorneys.

No. 643,162. Patented Feb. 13, 1900.
G. A. SCHEEFFER.
ALTERNATING CURRENT METER.
(Application filed May 11, 1899.)
(No Model.) 3 Sheets—Sheet 3.

Witnesses

Inventor:
Gustave A. Scheeffer,
By Charles A. Brown & Cragg
Attorneys.

United States Patent Office.

GUSTAVE A. SCHEEFFER, OF PEORIA, ILLINOIS, ASSIGNOR TO THE DIAMOND METER COMPANY, OF SAME PLACE.

ALTERNATING-CURRENT METER.

SPECIFICATION forming part of Letters Patent No. 643,162, dated February 13, 1900.

Application filed May 11, 1899. Serial No. 716,380. (No model.)

*To all whom it may concern:*

Be it known that I, GUSTAVE A. SCHEEFFER, a citizen of the United States, residing at Peoria, in the county of Peoria and State of Illinois, have invented a certain new and useful Improvement in Alternating-Current Meters, (Case No. 13,) of which the following is a full, clear, concise, and exact description, reference being had to the accompanying drawings, forming a part of this specification.

My invention relates to alternating-current wattmeters, and has for one object the elimination of defects heretofore existing in meters of this class, and for its further object the improvement in the construction of the meter whereby the construction is simplified and a perfect adjustment of the coöperating parts may be effected.

Alternating-current watt motor-meters consist, essentially, in a recording element, as a disk or cylinder, to which the counting-train is geared and which is arranged in a suitable magnetic field produced by exciting-windings placed in series with and in shunt to the working or distributing conductors, the function of the shunt-coils being to establish an alternating field of substantially constant strength, while the magnetization produced by the series winding varies in its cycles according to the volume of current passing in the consumption-circuit, whereby the recording element is subjected to a resultant turning effort or torque due to the coöperation or joint effects of the magnetizations produced by the series and shunt windings.

A well-known type of alternating-current wattmeter is one in which a resultant field due to two component fields differing in phase is employed to rotate the armature or recording element, the resultant field shifting or rotating, and thereby producing the rotation of the armature. The employment of a rotating or shifting field for the operation of meters is objectionable for several reasons, among the most important of which is that it is practically impossible to maintain a proportionate rate of rotation of the armature with the current consumed if the current should be supplied to the mains at widely-varying frequencies. The following theory may explain the error which it is one of the objects of my invention to eliminate. If a current of a given periodicity is being impressed upon the consumption-circuit, eddy-currents are set up in the armature, which vary in number and strength and in reactive effect upon the field with the current and voltage. Upon increasing the periodicity of the current the axis of the resultant magnetization travels more rapidly, and consequently produces more rapid rotation of the armature. The armature reactions not weakening in proportion to the increase in speed of the resultant, a faster rotation of the armature than is commensurate with the current consumed results. Conversely, if the frequency be reduced the axis of the resulting magnetism moves more slowly, but the reduced speed of the axis of the resultant is not compensated for by an increased reactive effect of the eddy-currents and a reduced speed of the armature not commensurate with the current used results.

I propose to overcome the defects above set forth as follows: I preferably initially adjust the meter so that its armature will rotate at a slightly-faster speed than is commensurate with the current consumed when it is impressed upon the circuit at the lowest frequency within the design of the system. To secure this initial adjustment in a perfect and convenient manner, I provide a mounting for the coils and core which permits of their adjustment transversely to the axis of rotation to adjust the amount of magnetic flux through the armature. I provide a magnetic by-path which is adjusted properly to reduce the number of lines of force that would otherwise thread the armature, and in order to secure the best results I employ in place of the cylinder heretofore used a thin disk composed, preferably, of aluminium. By providing this by-path or magnetic shunt I am enabled to secure the proper speed. By means of the magnetic shunt a certain proportion of the lines of force follow the path provided thereby, the proportion increasing upon increasing the frequency, so that while there are more frequent armature reactions the strength thereof is reduced, so that the turning effort is governed by the strength of these armature reactions, which varies in accordance with the frequencies. The resistance of the magnetic by-path of course should not be so low as to shunt all of the lines of force from the armature.

In accordance with my invention I cause the magnetic axes of the component magnetizing forces to pass through the disk longitudinally of its axis of rotation, and by this arrangement and the construction I employ there is not created in the operation of the meter a rotating field, whereby I have been enabled still further to eliminate the error above referred to.

By another feature of my invention I am enabled to adjust the reactions between the fields created by the shunt-windings and the eddy-currents due to these fields, whereby a perfect adjustment of the torque of the armature to overcome friction, &c., may be effected.

I will explain my invention and additional features thereof more particularly by reference to the accompanying drawings, illustrating the preferred embodiment thereof, in which—

Figure 4:
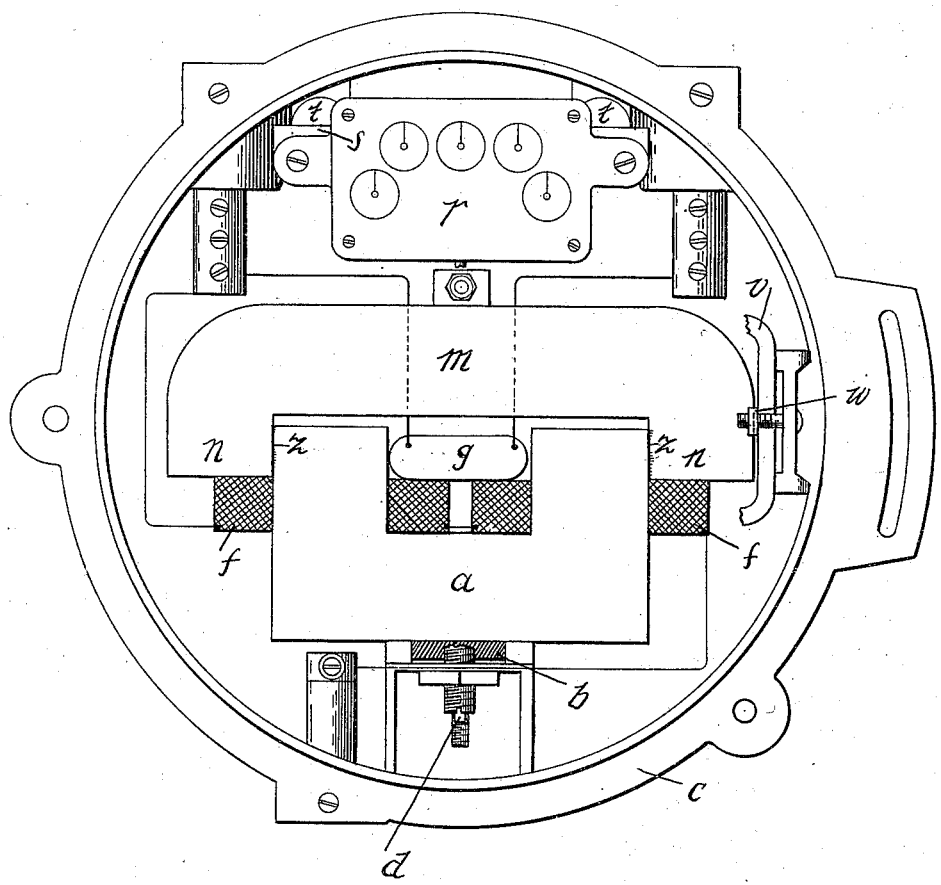

Figure 1 is a view in elevation of the meter constructed in accordance with the invention, its connections with the working circuit being indicated diagrammatically. Fig. 2 is a vertical sectional view on line 2 2 of Fig. 1. Fig. 3 is a horizontal sectional view on line 3 3, Fig. 1. Fig. 4 is a view in elevation of a meter constructed in accordance with the invention, certain parts being broken away and removed, more clearly to show the relative arrangement of the laminated bodies employed.

Like letters indicate like parts throughout the different figures.

The field-magnet core $a$ is preferably made up of a number of U-shaped laminæ held together by suitable clamping devices and mounted in a carrier-piece $b$, which is secured to the casing $c$ by a winged clamping-nut $d$ engaging a threaded stem extending from the carrier-piece. The said stem passes through a slot extending radially from the axis of rotation of the armature-disk $e$, so that the number of lines of force threading the armature-disk may be regulated by the transverse adjustment of the said core. Upon each limb of the core is placed a coil $f$ of fine wire, which are included in series with each other and in a bridge of the working conductors. These coils preferably have the same number of turns and are preferably disposed symmetrically with relation to the axis of rotation of the disk, whereby the reactions between the lines of force at each limb or pole of the core and each set of eddy-currents are equalized, so that when there are no lamps or other translating devices in circuit there is no turning effort exerted upon the disk, as the reaction at each pole counteracts the reaction at the other.

A series coil $g$ is included in circuit with one of the main conductors between the source of current and the translating devices and is preferably placed upon the same side of the disk with the shunt-coils, between the same and the disk, all of the coils being preferably transverse to the axis of the disk. The series coil is preferably coreless. The shunt and series coils in inductive relation to the disk are preferably located upon one side of the axis of rotation of the disk. By placing the shunt and series windings upon one side of the disk I am enabled accurately to produce more effective armature reactions.

Assuming that the meter is to be employed in connection with a working circuit upon which alternating current is conveyed at a uniform frequency, any suitable means will answer for completing the magnetic circuit for the lines of force threading the core $a$, whose pole-faces are preferably adjacent to the periphery of the disk, and I will therefore complete the description of the meter as it might be constructed for operation in connection with currents of uniform frequency.

The armature is subjected to effective turning effort upon the closure of circuit through the series coil, occuring when a translating device or devices are included in circuit in the working circuit. To adjust the armature reactions, I employ two torque devices consisting of U-shaped strips $h$ and $i$ of magnetic material, preferably sheet-iron, mounted to swing upon shafts $k$ and $l$, that may be secured in any position to which they are rotated. These U-shaped strips inclose the disk at its periphery, each being located near one of the poles of the core $a$ and each serving to modify the armature reactions, especially those occurring at the adjacent pole. Each strip exerts a turning effort upon the armature, tending to rotate the same in a direction opposite to that in which the other strip tends to rotate the armature, and by a proper relative adjustment of these strips I am enabled to counteract the effect of friction and properly to govern and adjust the reactions which might otherwise be faulty owing to structural and electrical defects. A U-shaped body $m$, made of laminated strips of sheet-iron, is provided upon the other side of the rotating armature, perpendicular or transverse to the plane of the armature, and affords two paths for the lines of force. The base portion of the said magnetic body serves to close the magnetic circuit for the lines of force threading the disk. The limbs or extensions $n\ n$ of the body $m$ engage the extensions of the body $a$, whereby a portion of the lines of force that would otherwise thread the disk are diverted in shunt-paths. If the engagement between the body $a$ and the parts $n\ n$ is direct, the engaging faces should be sufficiently oxidized to prevent all of the lines of force from threading the magnetic shunt. This same object may be accomplished, where the engaging faces are not oxidized sufficiently, by means of thin fiber strips $z$, Fig. 4, interposed between the opposed faces. The body $m$ thus acts in a double capacity, serving to afford a return-path for the lines of force threading the disk and acting to divert a proper number of lines of force in shunt-paths sufficiently to reduce the strength of the armature reactions to impart a proper speed to the armature. As the frequency increases, the resistance of the main magnetic circuit, including the armature and field-core $a$, increases, so that more lines of force are passed through the derived magnetic circuit, including the field-core common to both magnetic circuits and the magnetic shunt. The bodies $a$ and $m$ are mechanically united by brass strips $o$, and the series coil is mechanically united with the shunt-coils and the bodies $a$ and $m$ by an angular strip $p$. I prefer to reduce the length of the magnetic circuit by making the extensions of the bodies $a$ and $m$ as short as possible, a narrow space being provided between the poles of body $a$ and the base of the body $m$, in which the armature-disk may rotate. The relative mechanical adjustment of the series and shunt coils and the parts $a$ and $m$ may be effected before all of the parts of the meter are assembled, and these parts as a whole are adjustable with the core $a$ transversely to the axis of rotation of the disk, a support $q$ for the body $m$ being provided, which coöperates with the fastening device $d$ to effect this adjustment.

The shaft of the disk is mounted to rotate in any suitable form of jeweled bearings, the shaft being geared at its upper end to the counting-train $r$. This counting-train and the upper support for the shaft are mounted upon a supporting-plate $s$, inserted within slots provided in bosses $t\ t$, projecting from the casing of the meter, these slots permitting of the adjustment of the upper shaft-bearing and the counting-train toward or away from the meter and also permitting of the sidewise adjustment of the said bearing and counting-train. The adjustment after being secured is maintained by screws $u$ passing partially through the said bosses into engagement with the supporting-plate $s$. In order to prevent too-rapid rotation of the armature, I provide a permanent magnet $v$ for the well-known purpose of retarding the rotation of the armature, the heel portion of the magnet being adjustable transversely of the axis of rotation thereof, a clamp $w$ permitting of this adjustment.

While I have herein shown and particularly described one embodiment of my invention, it is obvious that changes may readily be made from the form of the invention shown and particularly described, and I do not therefore desire to be limited to the precise construction shown; but,

Having thus described my invention, I claim as new and desire to secure by Letters Patent—

1. In an alternating-current meter, the combination with a rotating disk, of a shaft upon which the same is adapted to rotate; a measuring-train; a laminated magnetic core of U shape, lying in a plane transverse to the disk, the pole of said core being adjacent to one face of the disk; a mass of laminated iron placed in juxtaposition with said core on the opposite side of said disk and adapted to complete the magnetic circuit of said core; two shunt-coils of fine wire disposed about the core; a series coil located between the fine-wire coils and between the disk and the said fine-wire coils, all of said coils being located transversely to the axis of rotation of the disk; means for adjusting said U-shaped core toward or from the axis of rotation of the disk to bring more or less of said disk into inductive relation to the said core, and a damping-magnet arranged in proximity to the disk, said core and series coil being located upon one side of the shaft, and the said damping-magnet being located opposite to said coils upon the other side of the shaft, substantially as described.

2. In an alternating-current meter, the combination with a rotating disk, of a measuring-train driven thereby; shunt and series windings in inductive relation to said disk; a magnetic core for said shunt-winding adjacent to one face of the disk, and a mass of magnetic material disposed adjacent to the opposite face of the disk and adapted to complete the magnetic circuit of said core, said windings, core and mass of magnetic material being directly mechanically united, substantially as described.

3. In an alternating-current meter, the combination with a rotating disk, of a measuring-train driven thereby; shunt and series windings in inductive relation to said disk; a magnetic core for said shunt-winding adjacent to one face of the disk and lying in a plane transverse thereto, a shunt-coil being about each polar extension of said core, the series coil being located between said coils and between the disk and the shunt-coils, and a magnetic body upon the other side of the disk to complete the magnetic circuit for the lines of force threading the said core, substantially as described.

4. In an alternating-current meter, the combination with a rotating disk, of a measuring-train driven thereby; shunt and series windings in inductive relation to said disk; a magnetic core for said shunt-winding adjacent to one face of the disk and lying in a plane transverse thereto, a shunt-coil being about each polar extension of said core, the series coil being located between said coils and between the disk and the shunt-coils, and a magnetic body upon the other side of the disk to complete the magnetic circuit for the lines of force threading the said core, the said coils, core and magnetic body being directly mechanically united, substantially as described.

5. In an alternating-current meter, the combination with a rotating disk, of a measuring-train driven thereby; shunt and series windings in inductive relation to said disk; a magnetic core for said shunt-winding adjacent to one face of the disk and lying in a plane transverse thereto, a shunt-coil being about each polar extension of said core, the series coil being located between said coils and between the disk and shunt-coils, and a magnetic body upon the other side of the disk, forming a magnetic shunt adapted to complete a magnetic circuit for the lines of force threading the disk and to divert lines of force into shunt-paths from the disk, substantially as described.

6. In an alternating-current meter, the combination with a rotating disk, of a measuring-train driven thereby; shunt and series windings in inductive relation to said disk; a magnetic core for said shunt-windings adjacent to one face of the disk and lying in a plane transverse thereto, a shunt-coil being about each polar extension of said core, the series coil being located between said coils and between the disk and the shunt-coils, and a magnetic body upon the other side of the disk, forming a magnetic shunt adapted to complete a magnetic circuit for the lines of force threading the disk and to divert lines of force into shunt-paths from the disk, the said coils, core and magnetic body being directly mechanically united, substantially as described.

7. In an alternating-current meter, the combination with a rotating disk, of a measuring-train driven thereby; shunt and series windings in inductive relation to said disk; a magnetic U-shaped core for said shunt-winding adjacent to one face of the disk and lying in a plane transverse thereto, a shunt-coil being about each polar extension of said core, and a magnetic U-shaped body upon the other side of the disk forming a magnetic shunt adapted to complete a magnetic circuit for the lines of force threading the disk and to divert lines of force into shunt-paths from the disk, substantially as described.

8. In an alternating-current wattmeter, the combination with series and shunt coils, of an element or armature for actuating the recorder in inductive relation to the said coils, and two adjustable torque devices $h$ $i$, each adapted to exert a turning effort upon the armature, tending to rotate the same in a direction opposite to that in which the other device tends to rotate the armature, whereby errors due to electrical and mechanical defects may be readily corrected, substantially as described.

9. In a recording, measuring instrument, the combination with a rotating shaft, of a measuring-train geared therewith; a supporting-plate $s$ for the said bearing and measuring-train, slotted bosses $t$ $t$, the slots in the bosses receiving the said plate, and fastening-screws $u$ $u$ to secure the plate and the bearing and measuring-train carried thereby in the position to which they may be adjusted, substantially as described.

10. In an alternating-current meter, the combination with series and shunt windings, of a rotating disk disposed perpendicularly with respect to the axes of magnetization due to said windings, said disk being located in position to have lines of force set up by the said windings thread the same, and means for shunting a portion of the lines of force that would otherwise go through the disk, substantially as described.

11. In an alternating-current meter, the combination with series and shunt windings, of a rotating disk disposed perpendicularly with respect to the axes of magnetization due to said windings, said disk being located in position to have lines of force set up by the said windings thread the same, and a derived magnetic circuit adapted to direct lines of force from the main magnetic circuit passing through the said disk, substantially as described.

12. In an alternating-current meter, the combination with a rotating disk, of series and shunt windings; a main magnetic circuit therefor for directing lines of force through the disk, and a derived magnetic circuit for shunting lines of force from the said disk, the axes of magnetization due to the said windings being perpendicular to the said disk, substantially as described.

13. In an alternating-current meter, the combination with a rotating disk, of a magnetic core placed perpendicularly thereto; a shunt-winding; a series coil, and an additional magnetic body affording a derived circuit to direct lines of force from the disk, substantially as described.

14. The combination with a rotating disk, of a magnetic core disposed perpendicularly thereto; a shunt-winding upon the said core; a series coil, and an additional magnetic body affording a path for the lines of force threading the disk and a shunt-path for diverting other lines of force from the disk, substantially as described.

15. In an alternating-current meter, the combination with a rotating disk, of a U-shaped magnetic core disposed perpendicularly thereto; a shunt-winding upon the said core; a series winding, and a second U-shaped magnetic body affording a path for the lines of force threading the disk and a shunt-path for diverting lines of force from the said disk, said magnetic bodies being located in proximity with each other, substantially as described.

16. In an alternating-current meter, the combination with a rotating disk, of a measuring-train driven thereby; shunt and series windings disposed in inductive relation thereto and upon the same side thereof; a magnetic core for said shunt-winding, the pole faces of said magnetic core being at the periphery of and in proximity to the face of the disk, and means for adjusting said core together with the shunt-winding thereon in a plane transverse to the axis of the disk to bring more or less of the surface of the disk within the influence of said core, substantially as described.

17. In an alternating-current meter, the combination with a rotating disk, of a measuring-train adapted to be driven thereby; shunt and series windings disposed inductively to said disk; a magnetic core for said shunt-winding adjacent to one face of the disk and at the periphery thereof; means for adjusting said core in a plane transverse to the axis of the disk to bring more or less of the disk within the influence of said core, and a mass of magnetic material upon the opposite side of the disk adapted to complete the magnetic circuit thereof, substantially as described.

18. In an alternating-current meter, the combination with a rotating disk, of a shaft upon which the same is adapted to rotate; a measuring-train; a laminated magnetic core of U shape, lying in a plane substantially perpendicular to the disk, the poles whereof are adjacent to one face of the disk; a mass of laminated iron placed in juxtaposition with said core on the opposite side of said disk and adapted to complete the magnetic circuit of said core; a shunt-winding of fine wire on said core; a series coil of coarse wire, the latter coil being placed substantially parallel with the disk, and means for adjusting said laminated core in a plane transverse to the axis of rotation of the disk, substantially as described.

19. In an alternating-current meter, the combination with a rotating armature, of a measuring-train driven thereby; shunt and series windings disposed inductively to said core and a support for said windings, permitting the same to be adjusted toward or away from the axis of rotation of said armature in a plane transverse to said axis, thereby to bring more or less of the armature into inductive relation to said windings, substantially as described.

20. In an alternating-current meter, the combination with an armature, of a series coil of coarse wire; a shunt-winding of fine wire; a magnetic core about which said shunt-winding is disposed, and a mass of magnetic material disposed in juxtaposition with said core and adapted to complete the magnetic circuit thereof, said armature being subjected to the action of the fields created by said winding, the shunt-coil being placed transversely to the axis of rotation of the armature, and means for adjusting the core together with the shunt-winding about the same toward or away from the axis of rotation, substantially as described.

21. In an alternating-current meter, the combination with a rotating disk, of a magnetic core placed substantially perpendicularly to the plane of rotation thereof; a shunt-winding of fine wire disposed about the core, whereby a polar region is produced having an axis perpendicular to the plane of rotation of the armature; a mass of laminated iron placed in juxtaposition with said core on the opposite side of said disk and adapted to complete the magnetic circuit thereof; means for adjusting said core together with the shunt-winding about the same in a plane transverse to the axis of rotation of the disk; a series coil of coarse wire also arranged in a plane transverse to the axis of rotation of the disk to produce a polar region having an axis practically at right angles to the plane of rotation, and a magnetic body near the face of said disk and in inductive relation to said core to produce an initial torque, substantially as described.

22. In an alternating-current meter, the combination with a rotating disk, of a measuring-train operated thereby, shunt and series windings in inductive relation to said disk, and located upon the same side thereof, the series winding being coreless, a magnetic core for said shunt-winding adjacent to one face of the disk, and a mass of magnetic material disposed adjacent to the opposite face of the disk and adapted to complete the magnetic circuit of said core, substantially as described.

In witness whereof I hereunto subscribe my name this 29th day of April, A. D. 1899.

GUSTAVE A. SCHEEFFER.

Witnesses:
W. J. H. CRIBB,
J. M. ERION.